(12) United States Patent
Kim et al.

(10) Patent No.: US 7,069,179 B2
(45) Date of Patent: Jun. 27, 2006

(54) WORKFLOW MINING SYSTEM AND METHOD

(75) Inventors: Yeong-Ho Kim, Anyang-si (KR); Sung Kim, Busan (KR); Byeong-Kwon Kwak, Incheon (KR); Yong-Woon Shin, Seoul (KR)

(73) Assignee: Handysoft Co., Ltd., Seoul (KR)

( * ) Notice: Subject to any disclaimer, the term of this patent is extended or adjusted under 35 U.S.C. 154(b) by 133 days.

(21) Appl. No.: 10/432,911

(22) PCT Filed: Sep. 30, 2002

(86) PCT No.: PCT/KR02/01834

§ 371 (c)(1),
(2), (4) Date: Jul. 30, 2004

(87) PCT Pub. No.: WO03/034287

PCT Pub. Date: Apr. 24, 2003

(65) Prior Publication Data

US 2004/0254768 A1    Dec. 16, 2004

(30) Foreign Application Priority Data

Oct. 18, 2001    (KR)    ........................ 10-2001-0064477

(51) Int. Cl.
*G06F 19/00* (2006.01)
(52) U.S. Cl. ................... 702/182; 702/186; 707/1; 707/104.1; 707/203
(58) Field of Classification Search ................ None
See application file for complete search history.

(56) References Cited

U.S. PATENT DOCUMENTS

| 6,272,478 | B1 | 8/2001 | Obata et al. |
| 6,278,977 | B1 | 8/2001 | Angrawal et al. |
| 6,665,669 | B1 * | 12/2003 | Han et al. ....................... 707/6 |
| 6,941,303 | B1 * | 9/2005 | Perrizo ........................... 707/6 |
| 6,985,890 | B1 * | 1/2006 | Inokuchi ...................... 706/46 |
| 2002/0059191 | A1 * | 5/2002 | Tamura ......................... 707/2 |
| 2002/0111824 | A1 * | 8/2002 | Grainger ........................ 705/1 |
| 2002/0161758 | A1 * | 10/2002 | Wang et al. ................... 707/6 |
| 2003/0009467 | A1 * | 1/2003 | Perrizo ....................... 707/100 |
| 2003/0023472 | A1 * | 1/2003 | Lee et al. ...................... 705/8 |
| 2003/0023662 | A1 * | 1/2003 | Yaung ......................... 709/106 |

(Continued)

FOREIGN PATENT DOCUMENTS

EP    0 895 169 A2    2/1999

(Continued)

OTHER PUBLICATIONS

Internet web page at www.portal.acm.org/citation.cfm?id=583200 entitled "C4.5: Programs for Machine Learning".*

(Continued)

*Primary Examiner*—Patrick J. Assouad
(74) *Attorney, Agent, or Firm*—Baker Botts L.L.P.

(57) ABSTRACT

The present invention discloses a workflow mining system which can evaluate, analyze and determine previous execution results of processes or activities by applying a data mining technique to workflow log data accumulated during the operation of a workflow system, and a method therefor. The workflow mining system extracts necessary data from a database of a workflow server, generates an analysis table, performs a preprocessing process for removing unnecessary attributes on the basis of the extracted data or converting a digital variable into a symbolic variable, and analyzes a decision making tree or association by using the preprocessed data. C4.5 algorithm is used for the decision making tree analysis and Apriori algorithm is used for the association analysis.

13 Claims, 24 Drawing Sheets

U.S. PATENT DOCUMENTS

| | | |
|---|---|---|
| 2003/0028531 A1* | 2/2003 | Han et al. .................... 707/6 |
| 2003/0041042 A1* | 2/2003 | Cohen et al. ................ 706/45 |
| 2003/0084142 A1* | 5/2003 | Casati et al. ............... 709/224 |
| 2003/0130991 A1* | 7/2003 | Reijerse et al. ............... 707/3 |
| 2003/0208488 A1* | 11/2003 | Perrizo ........................ 707/6 |
| 2003/0212691 A1* | 11/2003 | Kuntala et al. ............ 707/100 |
| 2003/0217055 A1* | 11/2003 | Lee et al. ..................... 707/6 |
| 2003/0236785 A1* | 12/2003 | Shintani et al. .............. 707/6 |
| 2004/0024773 A1* | 2/2004 | Stoffel et al. .............. 707/102 |
| 2004/0049504 A1* | 3/2004 | Hellerstein et al. ........... 707/5 |
| 2004/0083206 A1* | 4/2004 | Wu et al. ...................... 707/3 |
| 2004/0249779 A1* | 12/2004 | Nauck et al. ................ 706/47 |
| 2005/0027663 A1* | 2/2005 | Beekmann et al. .......... 706/12 |
| 2005/0027665 A1* | 2/2005 | Thiesson et al. ............. 706/25 |
| 2005/0027710 A1* | 2/2005 | Ma et al. .................... 707/100 |
| 2005/0177482 A1* | 8/2005 | Subrahmanian et al. ...... 705/35 |
| 2005/0251383 A1* | 11/2005 | Murray ........................ 704/9 |
| 2005/0273477 A1* | 12/2005 | Boulle ....................... 708/100 |
| 2005/0278324 A1* | 12/2005 | Fan et al. ..................... 707/6 |
| 2006/0015504 A1* | 1/2006 | Yu et al. ..................... 707/10 |

FOREIGN PATENT DOCUMENTS

| | | |
|---|---|---|
| JP | 11015842 | 1/1999 |
| KR | 10-2001-0039172 | 5/2001 |

OTHER PUBLICATIONS

Ruggierei, "Efficient C4.5", IEEE, 2002.*
Agrawal et al., "Fast Algorithms for Mining Association Rules", IEEE, 1994.*
Tagg, "Workflow Support Across Organisational Boundaries", IEEE, 1996.*
Certi et al., "WIDE—A Distributed Architecture for Workflow Management", IEEE, 1997.*
Schuster et al., "Clinet/Server Qualities: A Basis for Reliable Distributed Workflow Management Systems", IEEE, 1997.*
Tagg et al., "Using an Active DBMS to Implement a Workflow Enginer", IEEE, date unknown.*
Long et al., "A Prototype Secure Workflow Server", IEEE, unknown date.*

* cited by examiner

FIG. 4C

ANALYSIS TABLE GENERATION | DATA PREPROCESSING | DATA STATISTICS | DECISION MAKING TREE ANALYSIS | ASSOCIATION

-ANALYSIS TABLE GENERATION-

WM_PROCESS TABLE GENERATION | WM_ACTIVITY TABLE GENERATION | DATABASE CONNECTION | DATABASE DISCONNECT

| SVRID | PROCID | URGENT | PASSWD | CANTCNT | ATTACHCNT | NAME | CREATION | CREATION | CREATION | CREATION | CREATION |
|---|---|---|---|---|---|---|---|---|---|---|---|
| 000000'001 | 108 | T | F | 0 | 0 | Life Insurance Sales Process | AM | FRI | 8 | 9999999999 |
| 000000'001 | 109 | F | F | 0 | 0 | Car Insurance Sales Process | AM | FRI | 8 | 9999999999 |
| 000000'001 | 110 | F | F | 0 | 0 | Fire Insurance Sales Process | AM | FRI | 8 | 9999999999 |
| 000000'001 | 111 | F | T | 0 | 0 | Fire Insurance Sales Proces.. | AM | FRI | 8 | 9999999999 |
| 000000'001 | 112 | F | F | 0 | 0 | Car Insurance Sales Process2 | AM | FRI | 8 | 9999999999 |
| 000000'001 | 113 | F | F | 0 | 0 | Car Insurance Sales Process | AM | FRI | 8 | 9999999999 |
| 000000'001 | 114 | T | F | 0 | 0 | Life Insurance Sales Process | AM | FRI | 8 | 9999999999 |
| 000000'001 | 115 | F | F | 0 | 0 | Life Insurance Sales Process | AM | FRI | 8 | 9999999999 |
| 000000'001 | 116 | F | F | 0 | 0 | Car Insurance Sales Process | AM | FRI | 8 | 9999999999 |
| 000000'001 | 117 | F | F | 0 | 0 | Fire Insurance Sales Process | AM | FRI | 8 | 9999999999 |
| 000000'001 | 118 | F | F | 0 | 0 | Life Insurance Sales Process | AM | FRI | 8 | 9999999999 |
| 000000'001 | 119 | F | F | 0 | 0 | Life Insurance Sales Process | AM | FRI | 9 | 9999999999 |
| 000000'001 | 120 | F | F | 0 | 0 | Car Insurance Sales Process | AM | FRI | 9 | 9999999999 | select * from wm_process

EXECUTION | CLEAR

15:25:57: Workflow Miner by Kim Seung
15:25:57:(c) 2001 Information Lab. IE. Seoul National University, Korea
15:25:57: Started on MON, 17. 9. 2001
15:25:57: DATABASE CONNECT OK.

| | ANALYSIS TABLE GENERATION | DATA PREPROCESSING | DATA STATISTICS | DECISION MAKING TREE ANALYSIS | ASSOCIATION |
|---|---|---|---|---|---|

Open DB      Apply Filters      Replace

BASIC TABLE
DATA NAME: QueryResult
RECORD NO: 27     ATTRIBUTE NO: 62

PROCESS TABLE
DATA NAME: QueryResult
RECORD NO: 27     ATTRIBUTE NO: 62

BASIC TABLE ATTRIBUTE

All      None      Invert

| No. | ATTRIBUTE NAME | DATA TYPE | DATA TYPE CHANGE |
|---|---|---|---|
| 1 | ☐ SVRID | SYMBOL | |
| 2 | ☐ PROCID | NUMERICAL VALUE | STANDARD VALUE |
| 3 | ☑ URGENT | SYMBOL | |
| 4 | ☐ PASSWDFLAG | SYMBOL | |
| 5 | ☐ CMNTCNT | NUMERICAL VALUE | STANDARD VALUE |
| 6 | ☐ ATTACHCNT | NUMERICAL VALUE | STANDARD VALUE |
| 7 | ☑ NAME | SYMBOL | |
| 8 | ☑ CREATIONDTIME1 | SYMBOL | |
| 9 | ☑ CREATIONDTIME2 | SYMBOL | |
| 10 | ☑ CREATIONDTIME3 | NUMERICAL VALUE | STANDARD VALUE |
| 11 | ☐ CREATOR | SYMBOL | |

Filter
AttributeFilter-V      Add

Delete

BASIC TABLE ATTRIBUTE INFORMATION
ATTRIBUTE NAME: ACTTYPE14     ATTRIBUTE TYPE: SYMBOL
MISSING VALUE: 0(0%)     UNIQUE VALUE: 0(0%)
DISTINCTION VALUE: 0

15:25:57: Started on MON, 17. 9. 2001
15:28:09: DATABASE CONNETOK.
15:30:10: BASICTABLE load : QueryResult (27 Instances)
15:30:10: PROCESSING TABLE load : QueryResult (27 Instances)

FIG. 5D

| No. | ATTRIBUTE NAME | DATA TYPE | DATA TYPE CHANGE |
|---|---|---|---|
| 21 | ACTNAME6 | SYMBOL | |
| 22 | ACTTYPE6 | SYMBOL | |
| 23 | AR7 | NUMERICAL VALUE | STANDARD VALUE |
| 24 | ACTNAME7 | SYMBOL | |
| 25 | ACTTYPE7 | SYMBOL | |
| 26 | AR8 | NUMERICAL VALUE | STANDARD VALUE |
| 27 | ACTNAME8 | SYMBOL | |
| 28 | ACTTYPE8 | SYMBOL | |
| 29 | AR9 | NUMERICAL VALUE | STANDARD VALUE |
| 30 | ACTNAME9 | SYMBOL | |
| 31 | ACTTYPE9 | SYMBOL | |

17:03:16: PROCESSING TABLE load QueryResult-wminer.filters.AttributeFilter-V-R3,7-10,12,15,22-48,61-62(27 instanc
17:03:17: BASIC TABLE load QueryResult-wminer.filters.AttributeFilter-V-R3,7-10,12,15,22-48,61-62(27 instances)
17:03:24: PROCESSING TABLE load QueryResult-wminer.filters.AttributeFilter-V-R3,7-10,12,15,22-48,61-62-wminer,fil
17:03:26: BASIC TABLE load QueryResult-wminer.filters.AttributeFilter-V-R3,7-10,12,15,22-48,61-62-wminer,filters

FIG. 6A

| | ANALYSIS TABLE GENERATION | | DATA PREPROCESSING | | DATA STATISTICS | | DECISION MAKING TREE ANALYSIS | | ASSOCIATION |
|---|---|---|---|---|---|---|---|---|---|

— INPUT ATTRIBUTE SELECTION —

| No. | ATTRIBUTE NAME | DATA TYPE |
|---|---|---|
| 1 | ☐ URGENT | SYMBOL |
| 2 | ☐ NAME | SYMBOL |
| 3 | ☐ CREATIONDTIME1 | SYMBOL |
| 4 | ☐ CREATIONDTIME2 | SYMBOL |
| 5 | ☐ CREATORNAME | SYMBOL |
| 6 | ☐ DEPTID | SYMBOL |
| 7 | ☐ AR2 | SYMBOL |
| 8 | ☐ AR5 | SYMBOL |
| 9 | ☐ AR9 | SYMBOL |
| 10 | ☐ AR10 | SYMBOL |
| 11 | ☐ STATE1 | SYMBOL |

— BASIC STATISTICS —

DATA NAME: QueryResult-wminer.filters.AttributeFilter-V-R3,7-10,12,15,
22-48,61-62-wminer.filters.AttributeFilter

RECORD NO: 27                               ATTRUBUTE NO: 11

(1) URGENT
MODE: F          FREQUENCY: 19

(2) NAME
MODE: Car Insurance Sales Process     FREQUENCY: 7

(3) CREATIONDTIME1
MODE: AM         FREQUENCY: 24

(4) CREATIONDTIME2
MODE: FRI        FREQUENCY: 25

(5) CREATORNAME
MODE: Administrator    FREQUENCY: 23

(6) DEPTID
MODE: 9000000000       FREQUENCY: 23

17:05:40: PROCESSING TABLE load QueryResult-wminer.filters.AttributeFilter-V-R3,7-10,12,15,22-48,61-62-wminer.filte-
17:05:41: BASIC TABLE load : QueryResult-wminer.filters.AttributeFilter-V-R3,7-10,12,15,22-48,61-62-wminer.filter-
17:09:31: PROCESSING TABLE load QueryResult-wminer.filters.AttributeFilter-V-R3,7-10,12,15,22-48,61-62-wminer.filte-
17:09:32: BASIC TABLE load : QueryResult-wminer.filters.AttributeFilter-V-R3,7-10,12,15,22-48,61-62-wminer.filter-

FIG. 8D

| | ASSOCIATION RULE WINDOW | | | |
|---|---|---|---|---|
| | SUPPORTRATE(%) | RELIABILITY RATE(%) | RULE CONDITION | |
| 1 | C.19 | 1 | 1. [CREATIONDTIME1] = AM [CREATORNAME] = Administrat ⇨ [CEPTIC] = 9000000000 |
| 2 | C.19 | 1 | 2. [CREATIONDTIME1] = AM [CREATORNAME2] = FRI [DEPTI ⇨ [CREATCRNAME] = Acmin |
| 3 | C.19 | 1 | 3. [CREATIONDTIME1] = AM [CREATORNAME2] = FRI [CREAT ⇨ [STATE1] = OverDue |
| 4 | C.19 | 1 | 4. [CREATIONDTIME1] = AM [CREATORNAME2] = FRI [AR2] ⇨ [CREATCRNAME] = Acmin |
| 5 | C.19 | 1 | 5. [CREATIONDTIME1] = AM [CREATORNAME] = Administrat ⇨ [CREATCRNAME2] = FRI |
| 6 | C.19 | 1 | 6. [CREATIONDTIME1] = AM [CREATORNAME] = Administrat ⇨ [STATE1] = OverDue |
| 7 | C.19 | 1 | 7. [CREATIONDTIME1] = AM [DEPTID] = 9000000000 [AR2] ⇨ [STATE1] = OverDue |
| 8 | C.19 | 1 | 8. [URGENT] = F [AR2] = '(179-inf)' [AR9] = '(-inf-11 ⇨ [CREATCRNAME1] = AM |
| 9 | C.19 | 1 | 9. [CREATIONDTIME1] = AM [CREATORNAME] = Administrat ⇨ [CREATCRNAME2] = FRI |
| 10 | C.19 | 1 | 10. [CREATIONDTIME1] = AM [CREATORNAME2] = FRI [AR ⇨ [STATE1] = OverDue |

WORKFLOW MINING SYSTEM AND METHOD

RELATED APPLICATIONS

This application claims priority to Korean Patent application No. 10-2001-0064477 filed Oct. 18, 2001 and PCT Application No. PCT/KR02/01834 filed Sep. 30, 2002 entitled System and Method for Creating Personalized Template for Monitoring Workflows.

TECHNICAL FIELD

The present invention relates to workflow mining, and in particular to a workflow mining system and method which can evaluate, analyze and determine previous execution results of processes or activities by applying a data mining technique to workflow log data accumulated during the operation of a workflow system and data accumulated by an application system linked to the workflow system.

BACKGROUND ART

In general, a workflow is defined as a whole or partial business process for transmitting documents, information or activities from one participant to another participant according to a series of procedures or rules. A workflow system is an automatic system for collectively managing workflows.

Exemplary business processes include insurance contract service works of an insurance company, delivery service works of a delivery company and loan service works of a bank. The workflow system interprets and embodies the business process composed of relations and flows between resources relating to daily works of an organization, so that people can work by using the business process. It is called process execution.

The insurance contract service works will now be explained in detail with reference to FIG. 1. The business process has sequential steps of client order acceptance, contract document preparation, and prepared document approval. In the insurance contract service works, the order acceptance, document preparation and document approval works are respectively unit activities of the workflow. The unit activity of the workflow which is a minimum logical unit composing the process includes human beings, resources and information.

When an insurance contract order is accepted, a process generated according to the process definition is an instance. Therefore, a plurality of instances exist in one process definition. When the instance is performed and ended, information relating to the process instance is stored in an archive.

The workflow system generally provides a function of searching, analyzing or evaluating a process and a person working in the process, including a start time, an end time, a person in charge, a person delaying work, an overdue work, and a time consumed to perform the whole process. Such functions of the workflow system serve to embody economical techniques such as the activity based management or the balanced score card.

However, the conventional workflow system can provide very basic functions for evaluating the activities or processes. As a result, there is a strong demand for an analysis method for measuring and evaluating results of the activity process by efficiently analyzing a lot of data accumulated during the workflow execution.

DISCLOSURE OF INVENTION

Accordingly, an object of the present invention is to provide a workflow mining system and method which are designed to apply a special data mining technique to a workflow system.

In order to achieve the above-described object of the invention, there is provided a workflow mining system which is mounted on a workflow server having a workflow engine and a database for performing data mining on the basis of log data of the database, including: a data extracting and processing means for extracting necessary data from the database and generating an analysis table; a preprocessing means for removing unnecessary attributes on the basis of the extracted data, or converting a digital variable into a symbolic variable; and an analysis means for analyzing a decision making tree for deducing decision making tree type potential rules by using the preprocessed data, or analyzing association on the basis of support and reliability among the attributes.

In addition, there is provided a workflow mining method which performs data mining on the basis of log data of a database of a workflow server, including: (a) a step for extracting necessary data from the database and generating an analysis table; (b) a preprocessing step for removing unnecessary attributes on the basis of the extracted data, or converting a digital variable into a symbolic variable; and (c) an analysis step for analyzing a decision making tree for deducing decision making tree type potential rules by using the preprocessed data, or analyzing association on the basis of support and reliability among the attributes.

BRIEF DESCRIPTION OF THE DRAWINGS

The present invention will become better understood with reference to the accompanying drawings which are given only by way of illustration and thus are not limitative of the present invention, wherein:

FIGS. 4A to 4D are views illustrating a process of a data extracting and processing module;

FIGS. 5A to 5D are views illustrating a process of a preprocessing module;

FIGS. 6A to 6C are views illustrating a process of a data statistics module;

FIGS. 8A to 8D are views illustrating a process of an association analysis module.

BEST MODE FOR CARRYING OUT THE INVENTION

A workflow mining system and a method therefor in accordance with a preferred embodiment of the present invention will now be described in detail with reference to the accompanying drawings.

Figure 1:
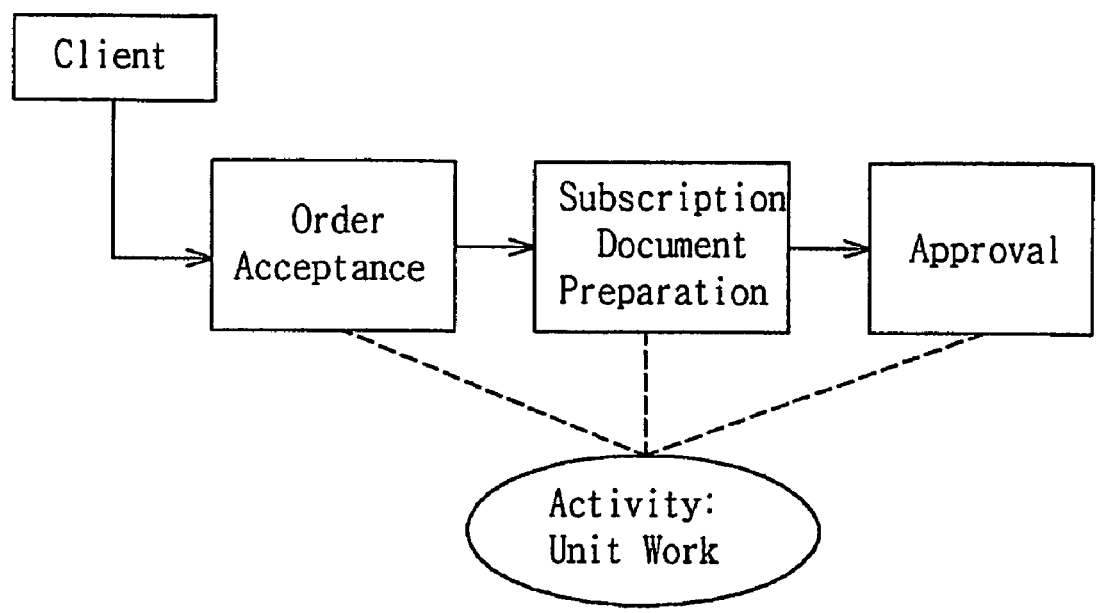
FIG. 1 is a view illustrating a business process for an insurance contract service work.
Figure 2:
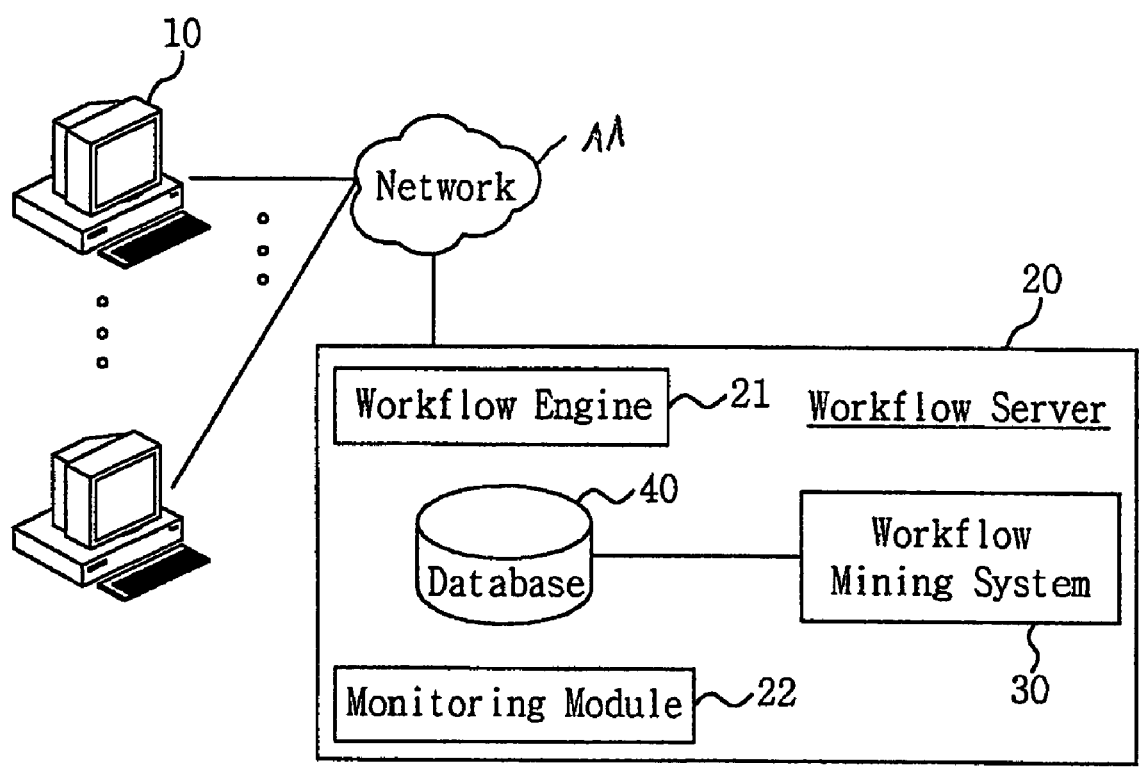
FIG. 2 is a view illustrating an application state of a workflow mining system in accordance with the present invention.

FIG. 2 is a view illustrating an application state of the workflow mining system 30 in accordance with the present invention. Referring to FIG. 2, the workflow mining system 30 is mounted on a workflow server 20, and the workflow server 20 is connected to at least one client computer 30. These systems can access to each other through an internal local area network (LAN), wide area network (WAN) or internet network. In accordance with the present invention, the 'internet network' implies network sets accessible to each other according to a standard protocol such as the TCP/IP, HTTP, and a wireless internet protocol (for example, WAP). It covers future variations including modifications or additions for the existing standard protocol.

The workflow server 20 includes a workflow engine 21, a monitoring module 22 and the workflow mining system 30.

The workflow engine 21 controls activities based on the process definition, and receives control commands for adding, correcting, deleting and searching a document file from the client, or operates according to a self operation. The workflow engine 21 includes an organization management module, a folder management module, a flow control module, a DB storage module and a file management module.

The organization management module performs ID management, and access right grant and deletion (login control) to manage people who join the workflow system.

The folder management module is used to systematically manage items on the process definition. That is, it enables the users to know which process definition exists in which folder. For example, the car insurance process definition, life insurance process definition and fire insurance process definition can be stored in an insurance folder.

The flow control module serves to transmit the control command to the DB storage module or file management module on the basis of the command from a client computer 10 or self-operation.

The DB storage module stores a document file defined in the client computer 10, process definition, version relation between the document files, and correction date and corrector of the document file in a database 40.

The monitoring module 22 includes functions for observing flow of the process according to a variety of process information generated by the flow control module. Here, the variety of process information is stored in the database 40.

The database 40 stores various log data generated during the operation of the workflow system, such as the process definition generated by operating the workflow engine 21, archive, instance, user, document file, document history, creator and corrector.

The workflow mining system 30 evaluates, analyzes and determines previous execution results of processes and activities on the basis of the log data of the database 40 upon the request of the administrator, so that the data can be used as objective data for business process reengineering (BPR).

Figure 3:
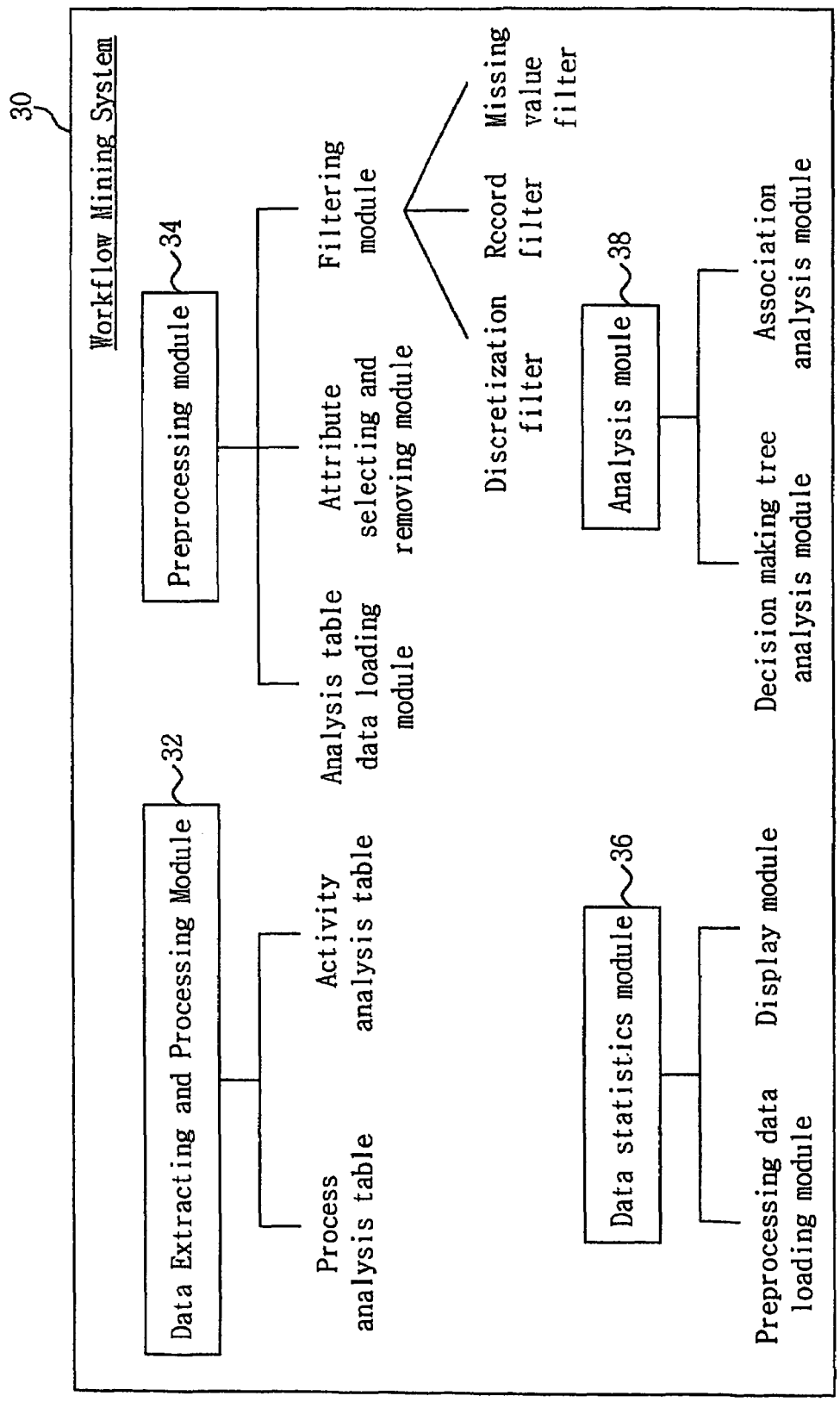
FIG. 3 is a detailed structure view illustrating the workflow mining system.

FIG. 3 is a detailed structure view illustrating the workflow mining system 30. As illustrated in FIG. 3, the workflow mining system 30 includes a data extracting and processing module 32, a preprocessing module 34, a data statistics module 36 and an analysis module 38.

The data extracting and processing module 32 extracts necessary data from the database 40 and generates an analysis table. Processes and activities can be individually analyzed. In general, processes are firstly analyzed and then activities are analyzed in detail, which is not intended to be limiting. The data extracting and processing module 32 has a process analysis table generating module and an activity analysis table generating module to extract data and generate an analysis table. The preprocessing module 34 searches characteristics of data on the basis of the data extracted by the analysis table, removes unnecessary attributes, divides instances if necessary, and converts a digital variable into a symbolic variable by dividing sections. For this, the preprocessing module 34 includes an analysis table data loading module, an attribute selecting and removing module and a filtering module, and the filtering module includes a discretization filter, a record filter and a missing value filter.

The data statistics module 36 provides basic statistical values for the preprocessed data set in form of text or graph to grasp the basic association among the variables. For this, the data statistics module 36 includes a preprocessing data loading module and a display module.

The analysis module 38 makes an analysis of the preprocessed data by using a few analysis algorithms. The analysis module 38 analyzes a decision making tree and association, and thus includes a decision making tree analysis module and an association analysis module.

FIGS. 4A to 4D are views illustrating a process of the data extracting and processing module 32.

Figure 4A:
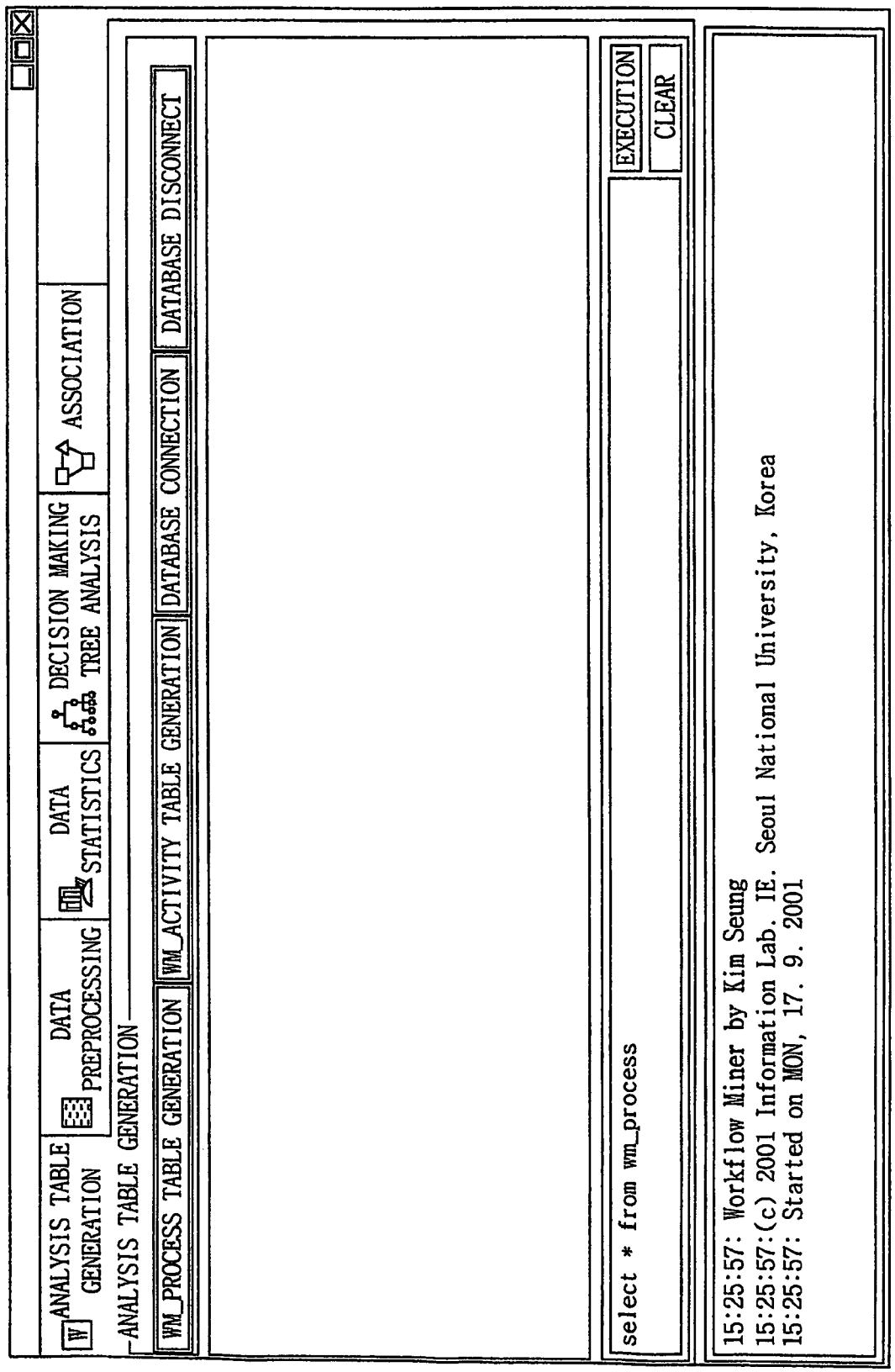
Figure 4B:
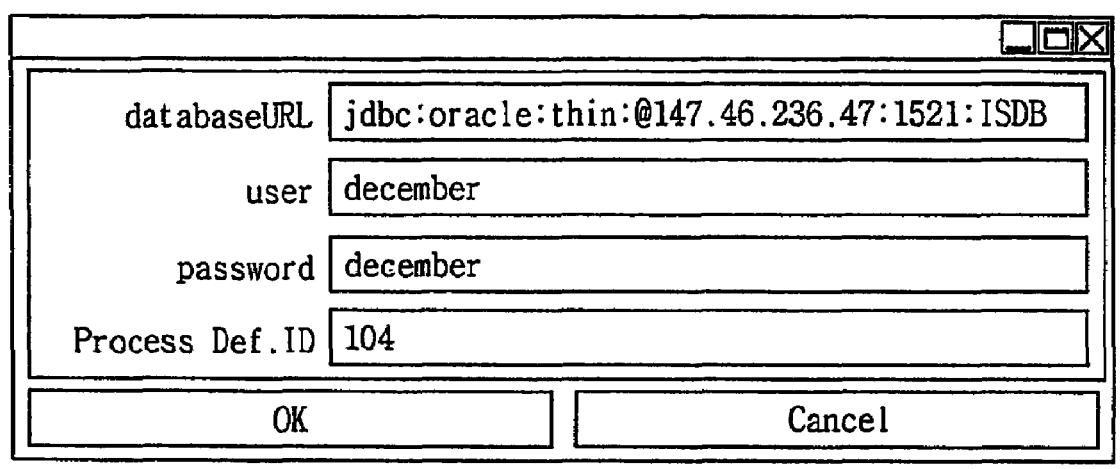

FIG. 4A shows an initial screen where the data extracting and processing module 32 generates the analysis table. When a 'WM_PROCESS table generation' button is pressed to generate the process analysis table as shown in FIG. 4A, the process analysis table generating module is executed as shown in FIG. 4B, an input window for connection to the database 40 is opened, and a user ID, password and analysis object process definition ID are inputted thereto. The analysis table generating module extracts general information of the process instance having the inputted process definition ID from the database 40 and finishes generation of the table. FIG. 4C shows one example of the generated analysis table. As depicted in FIG. 4C, the attributes of the process analysis table include a server ID SVRID, a process instance identifier PROCID, a flag showing urgency URGENT, a flag showing a password check state in processing items PASSWDF, a comment number CMNTCNT, an attachment number ATTACHCNT, a process instance explanation NAME, a creation time in a.m/p.m. CREATIONDTIME1, a creation time on a day of the week CREATIONDTIME2, a creation time in a time slot CREATIONDTIME3, a process instance creator ID CREATOR and a process instance creator name CREATOR NAME. Since the log data previously prepared in the database 40 are used as data of the attributes, the attributes of the process analysis table can be a part or whole of the attributes of the database 40.

Figure 4D:
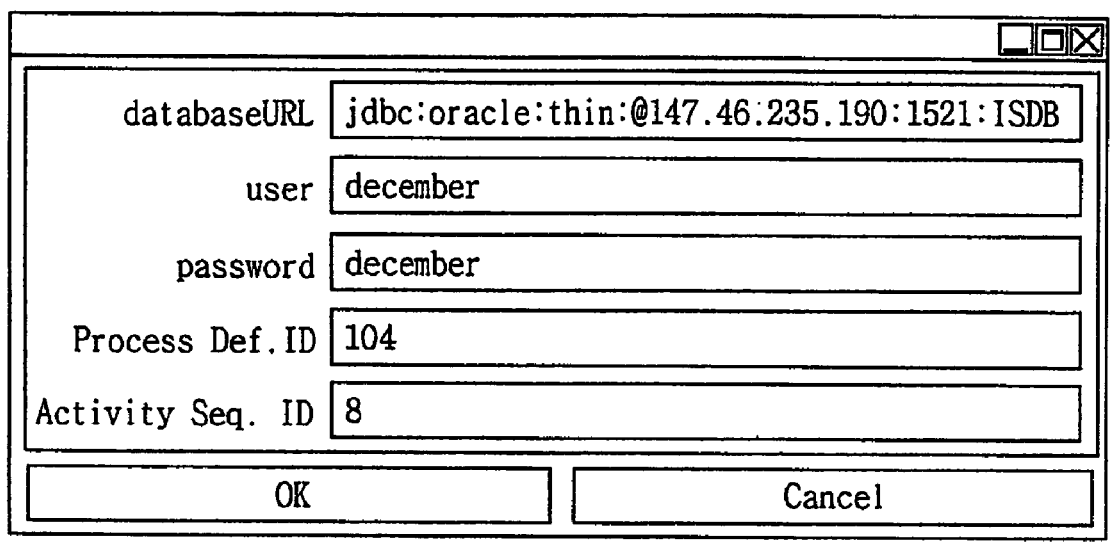

On the other hand, when the data extracting and processing module 32 is intended to generate the activity analysis table, a 'WM_ACTIVITY table generation' button is pressed on the initial screen of FIG. 4A, the activity analysis table generating module is executed as shown in FIG. 4D, the input window for connection to the database 40 is opened, and a user ID, password, process definition ID of analysis object activity and activity sequence ID are inputted thereto. The activity table generating module extracts general information of the process instance having the inputted process definition ID and activity sequence ID from the database 40 and finishes generation of the table. The attributes of the generated activity analysis table become a part or whole of the fields of the database 40 identically to the process analysis table.

FIGS. 5A to 5D are views illustrating a process of the preprocessing module 34.

Figure 5A:
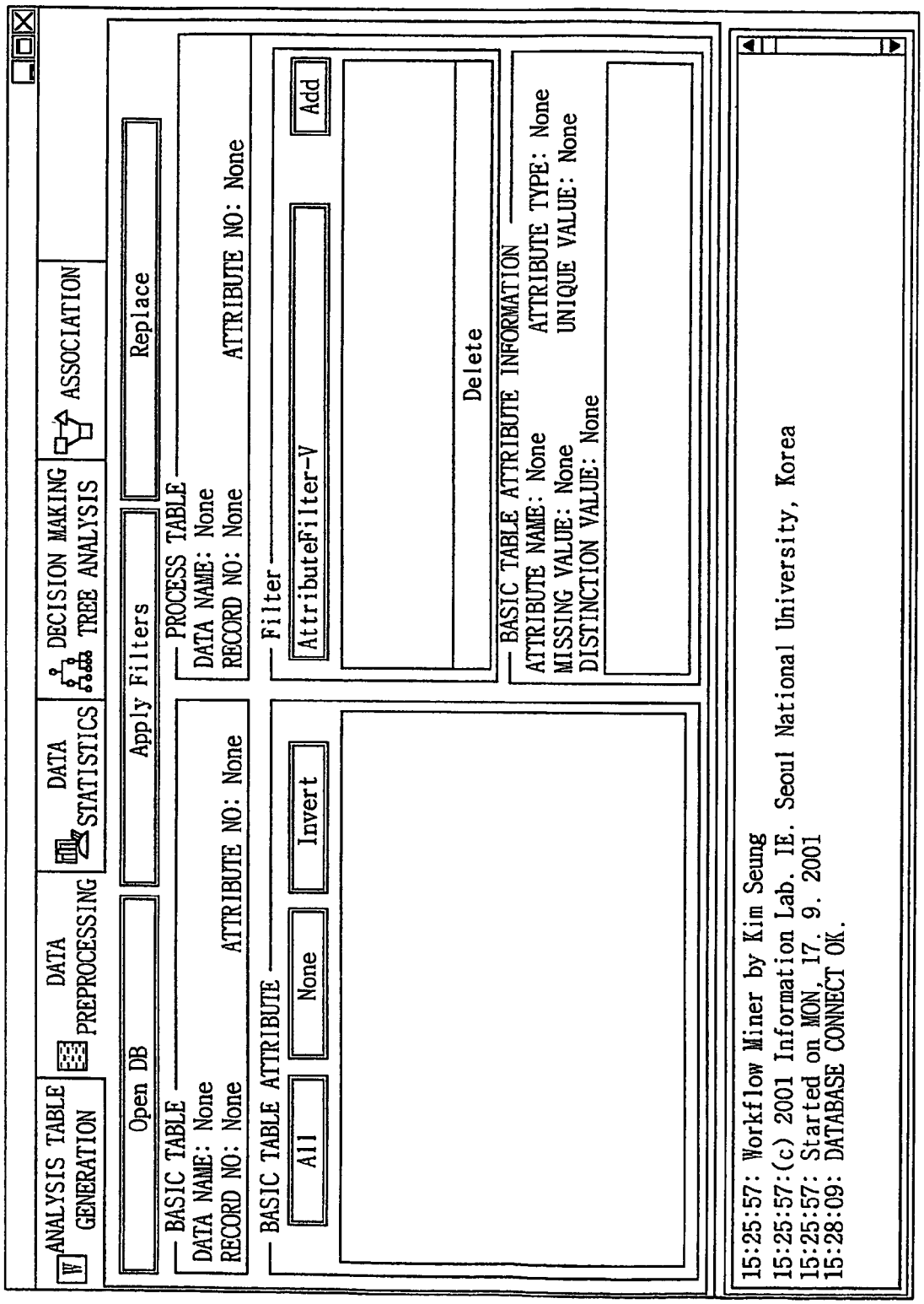
Figure 5B:
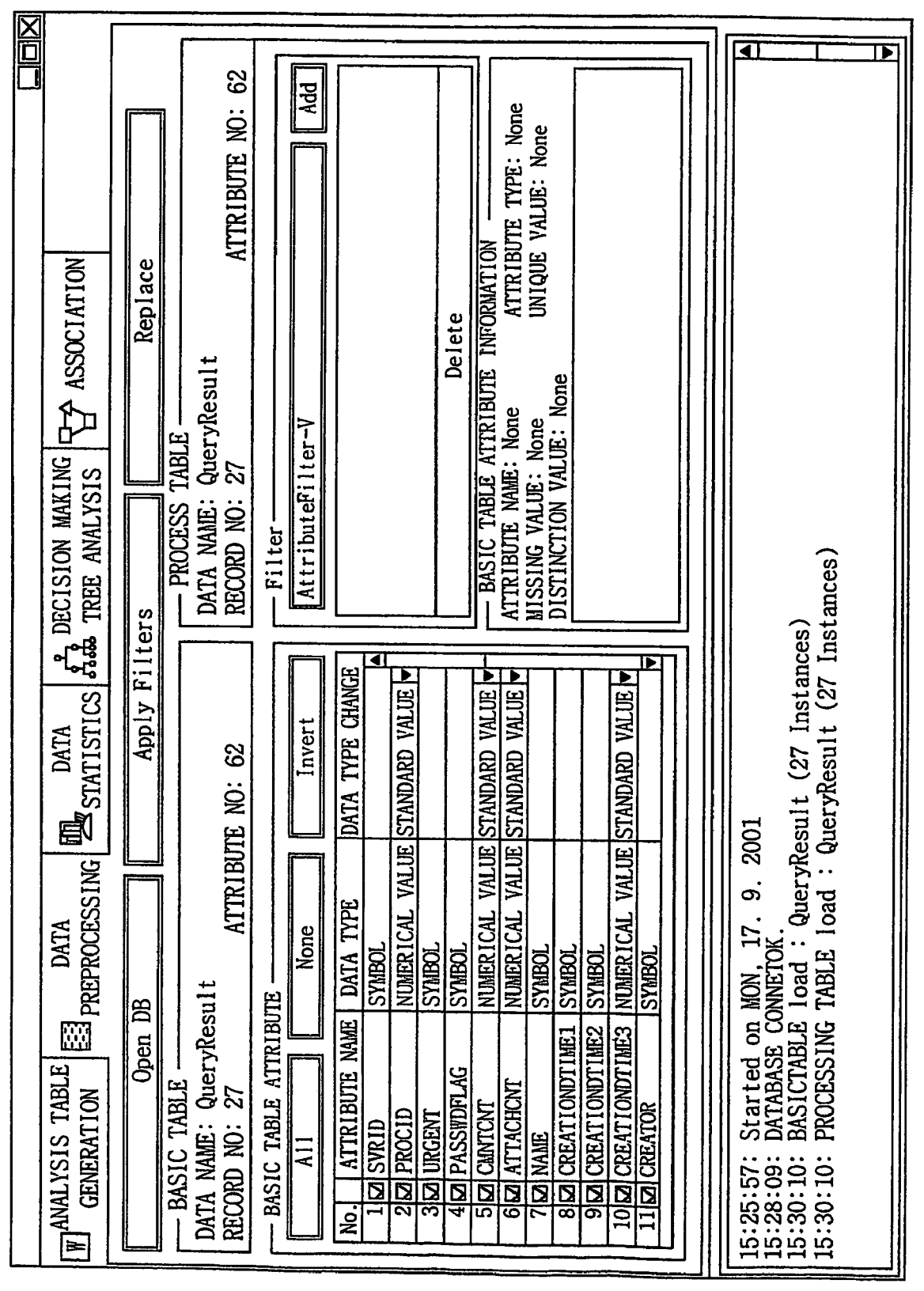

FIG. 5A shows an initial screen where the preprocessing module is executed. The preprocessing module is started by pressing a 'data preprocessing' tap button at the top end of the screen of FIG. 5A As illustrated in FIG. 5A, the preprocessing module includes a basic table for data extracted by the analysis table, and an operation table for preprocessed data. A preprocessing method is dependent upon a kind of analysis module which will later be used. It is thus important to perform a proper preprocessing process according to a purpose of the analysis. An analysis table data loading module is executed by pressing an 'Open DB . . . ' button of the basic table, thereby loading data of the analysis table. FIG. 5B shows a result of loading. An attribute window of the basic table displays attribute names and types. When the user clicks a wanted attribute, an attribute information window of the basic table shows characteristics of the attribute. The characteristics of the attribute show a variable and frequency in the symbolic format and a maximum, minimum, standard deviation and average in the digital format.

In order to remove unnecessary attributes, selection of the unnecessary attributes is canceled in the check box as shown in FIG. 5C, and an attribute selecting and removing module is executed by pressing an 'Apply Filters' tap button, thereby obtaining the result of FIG. 5D. That is, a number of the attributes is 62 before removing the unnecessary attributes, but reduced to 35 after removing them. On the other hand, a process for dividing the digital variables by the symbolic variables is additionally required to analyze association after the preprocessing process. In this case, the discretization filter is used and thus two algorithms are used: the first one is a method for dividing a maximum value section and a minimum value section into predetermined sections in the attribute distribution and discretizing variables, namely unsupervised discretization, and the second one is a method for discretizing attributes according to the distribution of class variables, namely supervised discretization. On the other hand, the record filter is a filter for excluding a specific record (same meaning as the instance) from the analysis object. For example, the record filter is used to exclude process instances from the analysis object after the process instance identifier PROCID 120 in FIG. 4C. In addition, the missing value filter is used when a variable is empty. Mostly, the missing value filter uses a method for replacing the digital variable by an average and the symbolic variable by a mode which is the most frequently generated value.

When the preprocessing module 34 finishes the preprocessing process relating to removal of attributes, conversion of variables and removal of records, the data statistics module 36 provides the basic statistical values for the data set in form of text or graph to grasp the basic association of the variables.

Figure 6B:
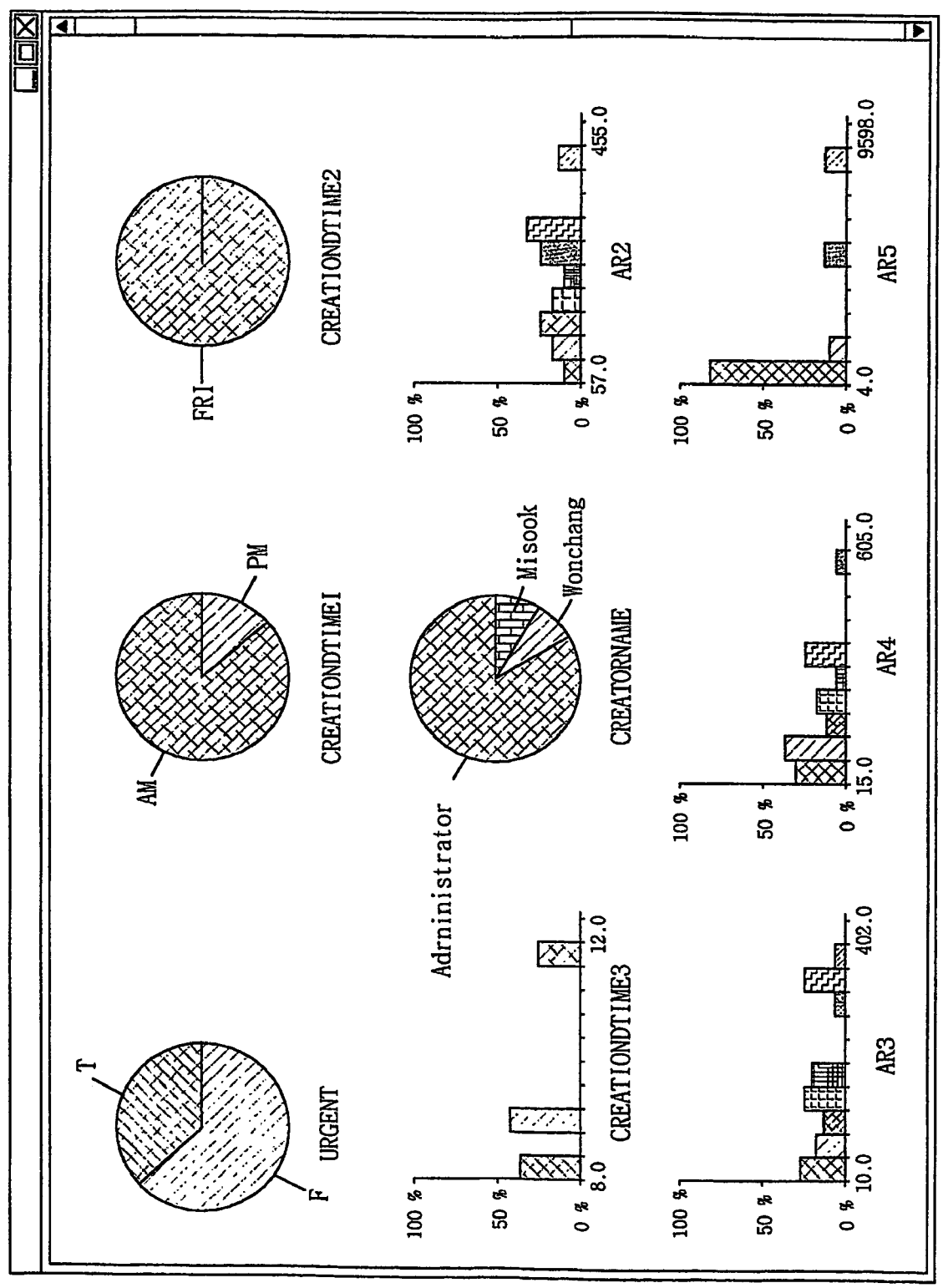
Figure 6C:
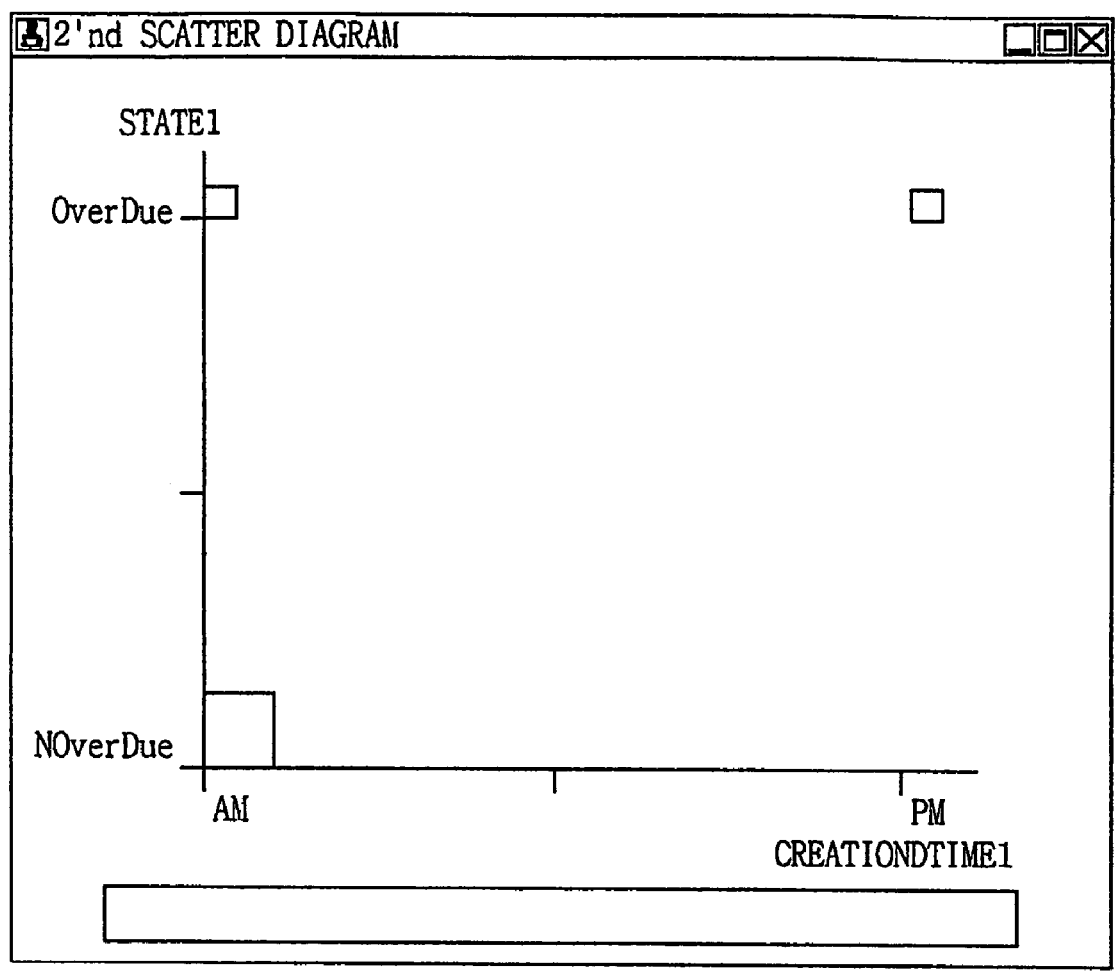

FIGS. 6A to 6C are views illustrating a process of the data statistics module 36. FIG. 6A shows an initial screen where the data statistics module 36 is executed. The data statistics module is started by pressing a 'data statistics' tap button at the top end of the screen of FIG. 6A. When the user clicks the 'data statistics' button, the data preprocessed by the preprocessing data loading module are loaded to provide statistical values for each variable. That is, a minimum, maximum, average and standard deviation are displayed for the digital variables and a mode and frequency are displayed for the symbolic variables. When the user clicks a 'basic statistics distribution' button at the right bottom end of FIG. 6A, the display module is executed to display the symbolic variables in form of a pie chart and the digital variables in form of a histogram in regard to the basic statistic values. FIG. 6B shows the pie chart and histogram of the basic statistic values. In addition, when the user clicks a 'secondary scatter diagram' button at the left bottom end of FIG. 6A, the basic association between two attributes is displayed. FIG. 6C shows a secondary scatter diagram displaying association between the variable implying the creation time in a.m. and p.m. CREATIONDTIME1 and the variable implying an overdue process instance STATE1. It can be inferred that the two variables are closely associated with each other when the variable CREATIONDTIME1 has a variable value of AM and the variable STATE1 has a variable value of NOverDue.

The analysis module 38 analyzes the decision making tree or association on the basis of the variables or attributes preprocessed by the preprocessing module 34 and data.

FIGS. 7A to 7E are views illustrating a process of the decision making tree analysis module.

The decision making tree analysis produces potential rules for object variables (class variables) in form of a decision making tree.

Figure 7A:
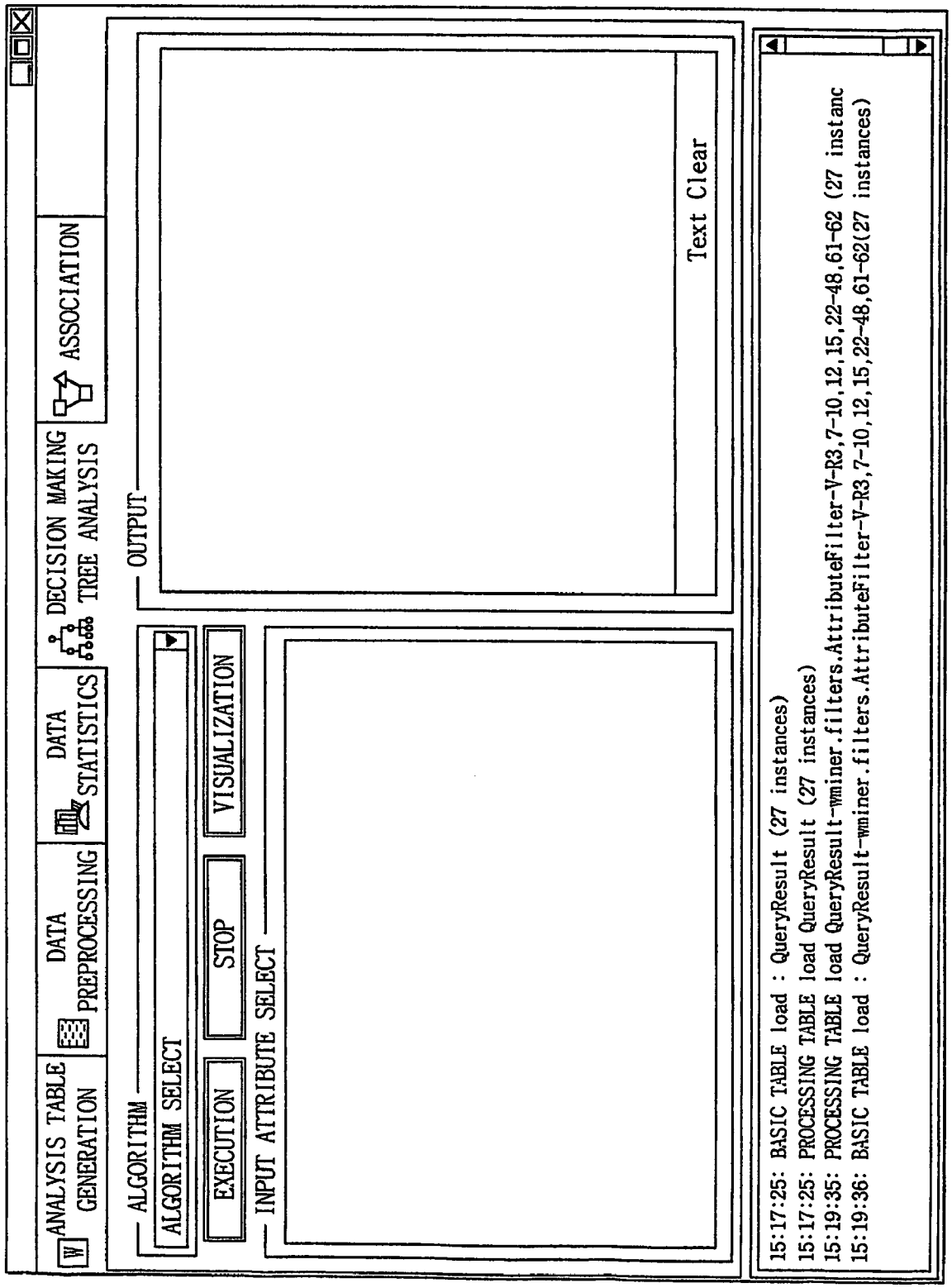
FIGS. 7A to 7E are views illustrating a process of a decision making tree analysis module.
Figure 7B:
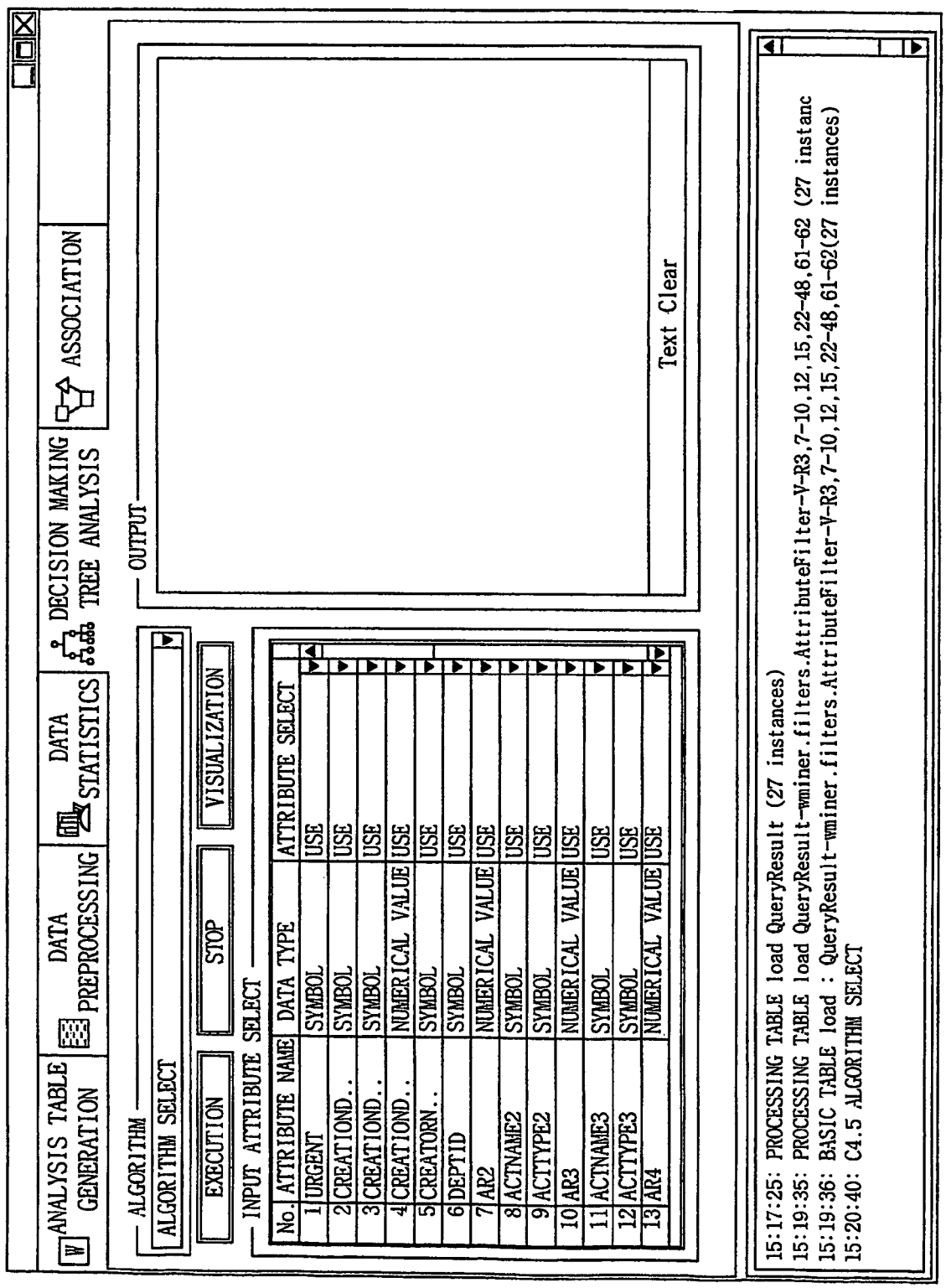
Figure 7C:
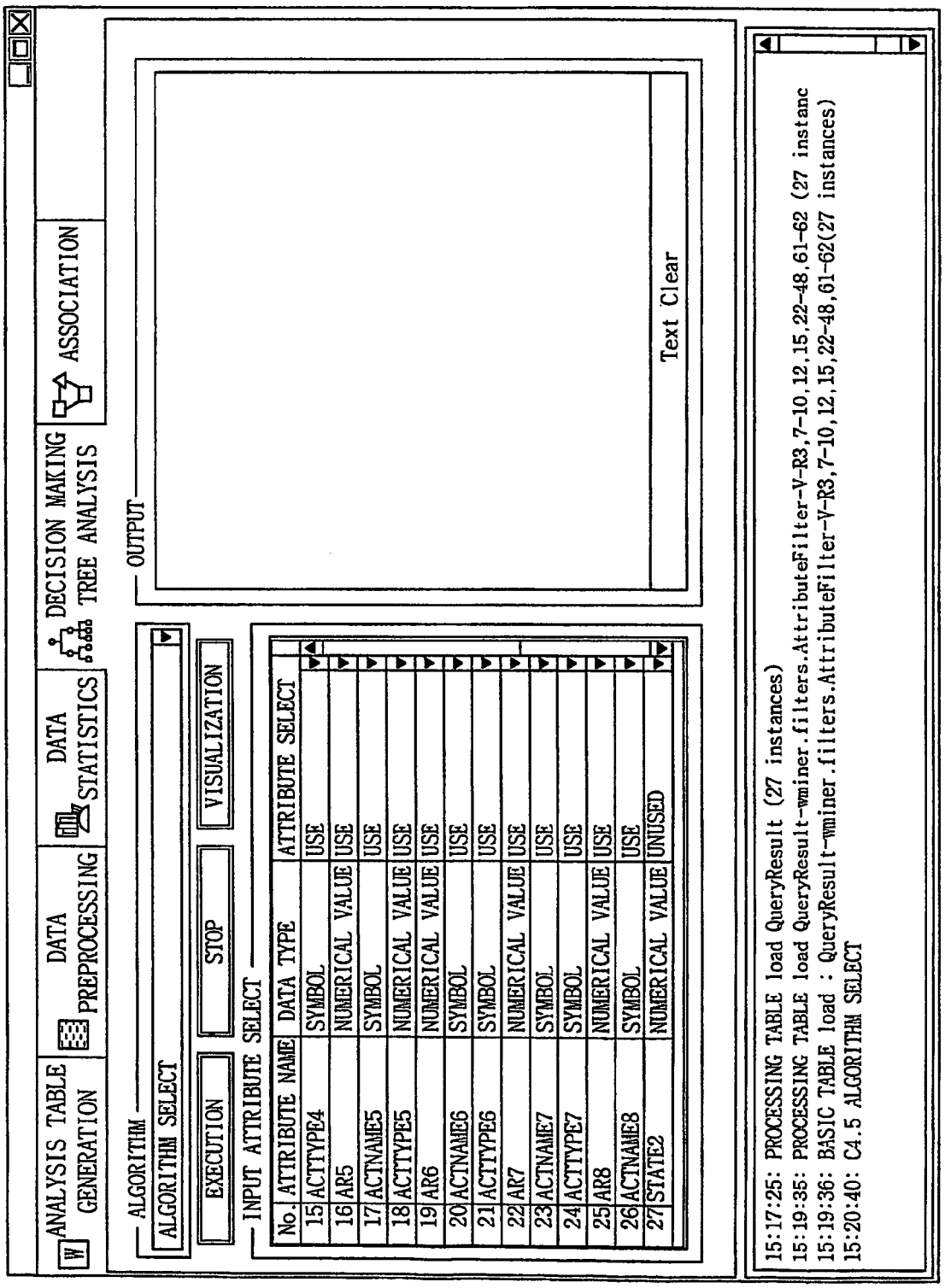

FIG. 7A shows an initial screen where the decision making tree analysis module is executed. The decision making tree analysis module is started by pressing a 'decision making tree analysis' tap button at the top end of the screen of FIG. 7A When the decision making tree analysis module is executed, the user selects an algorithm for the decision making tree analysis. In accordance with the present invention, C4.5 algorithm suggested by J Ross Quinlan is employed as the algorithm for the decision making tree analysis, which is not intended to be limiting. As shown in FIG. 7B, when the user selects the algorithm, the decision making tree analysis module loads the preprocessed attribute data and makes the user decide whether to use the data for the analysis by variables. FIG. 7C shows a state where selection of the variables for the analysis and designation of the class are finished. The class indicates a variable which is an object of potential rule deduction. In the decision making tree analysis, a pair of a class variable and a specific value become a result of the rules. For example, when the user intends to obtain the potential rules for overdue cases of the variable implying the overdue process instance STATE1 (pair of variable STATE1 and variable OverDue), the variable STATE1 becomes the class and the class needs to be symbolic for the decision making tree analysis. Thus, the digital class variable must be converted into the symbolic variable by the discretization filter in the preprocessing process. Since the decision making tree analysis is a directed analysis method, one of the variables which are analysis objects must be designated as the class.

Figure 7D:
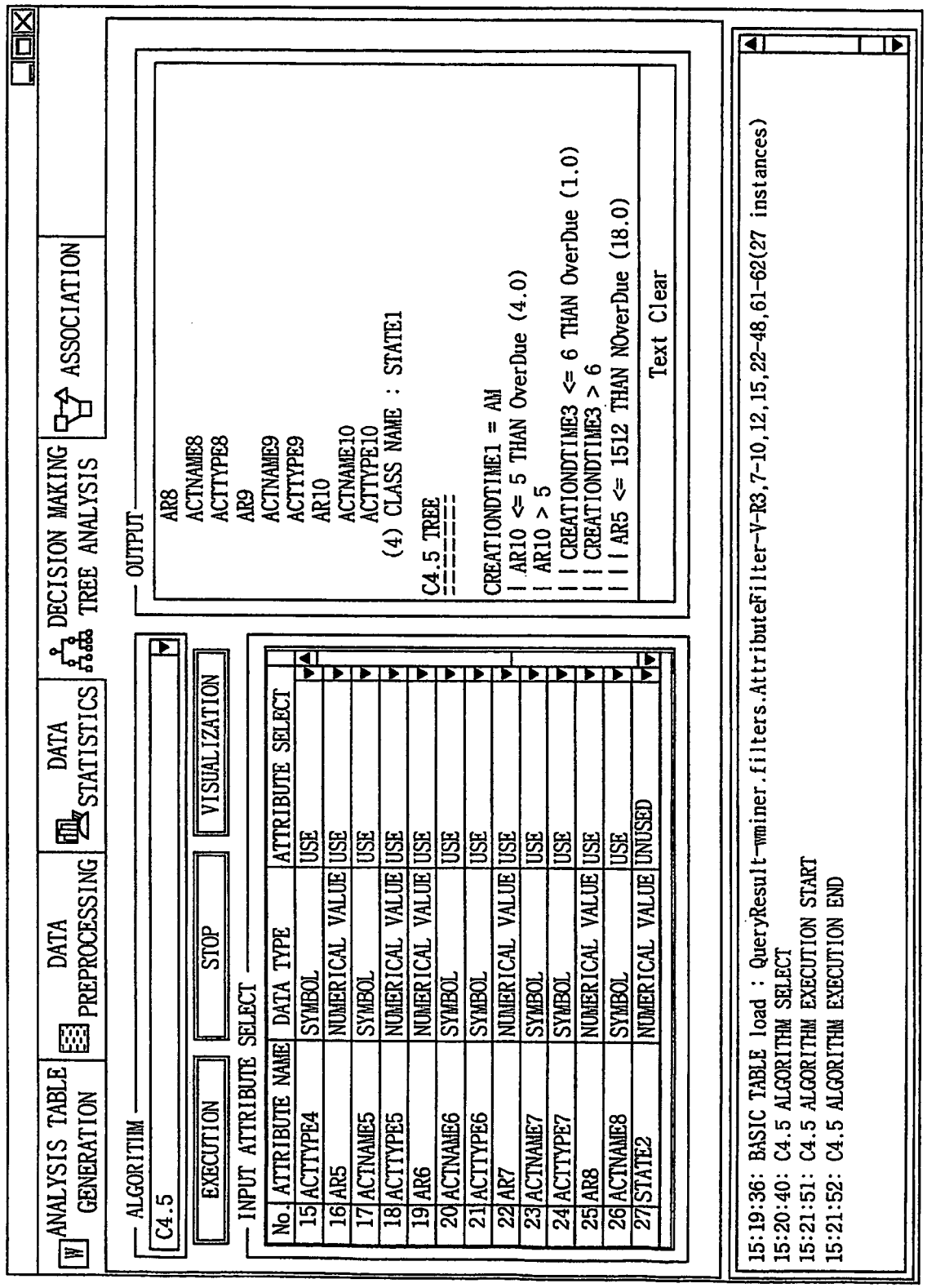
Figure 7E:
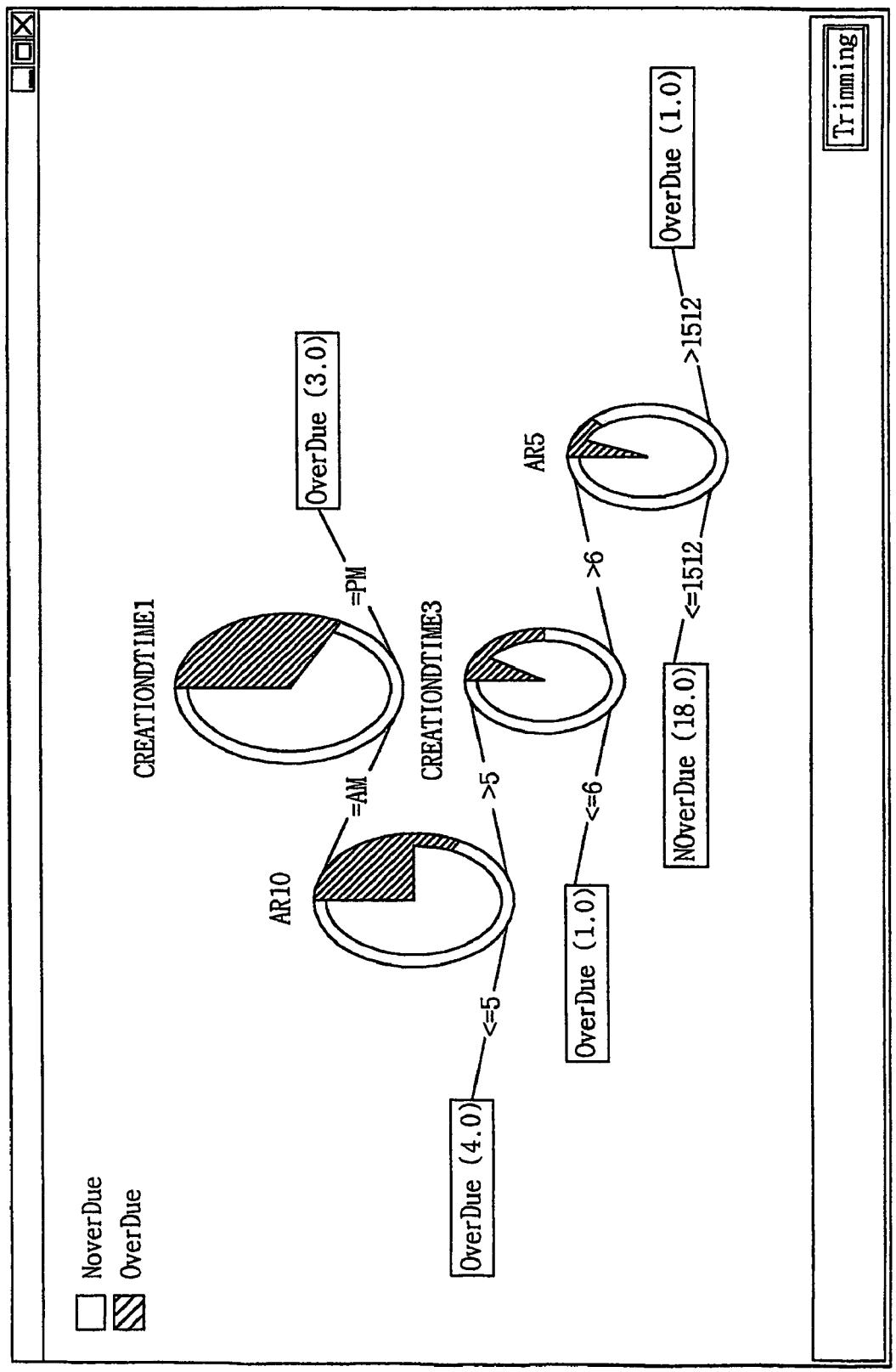

Referring to FIG. 7C, the last variable STATE2 is selected not to be used for the analysis, and the variable designated as the class is STATE1. When selection of the variables is finished, the user clicks an 'execution' button to make the decision making tree analysis. A result of the analysis is displayed in form of text as shown in FIG. 7D. It can be displayed in form of graph by clicking a 'visualization' button as shown in FIG. 7E. FIGS. 7D and 7E show the analysis for searching the variables influencing the overdue process when the class variable is STATE1. The most influencing variable on STATE1 is CREATIONDTIME1 and the succeeding influencing variables are AR10, CREATIONDTIME3 and AR5.

That is, the process is overdue on the following occasions:

1) the process is performed in the afternoon, 2) the process is performed in the morning and the execution time of the $10^{th}$ activity is below 5, 3) the process is performed in the morning, the execution time of the $10^{th}$ activity is over 5, and the process is performed before 6, and 4) the process is performed in the morning, the execution time of the 10$^{th}$ activity is over 5, the process is performed after 6, and the execution time of the 5$^{th}$ activity is over 1512.

As depicted in FIG. 7E, four internal nodes are provided. Each of the nodes is displayed in a circle shape. The outside circle shows a distribution ratio of the class variables in a parent node, and the inside circle shows a separation ratio of the class variables according to the separation standard of the corresponding node. A rectangular shape represents a leaf node and a number of a parenthesis is a number of the instances in the data set belonging to the corresponding leaf node. When the tree is complicated, complexity can be reduced by trimming. Especially, the rules generated from the most significant node to the corresponding node and the number of the instances are displayed by clicking a specific node.

The process for analyzing the decision making tree by using the preprocessed data was explained above. However, association can be analyzed for another analysis.

The association analysis implies searching for the association or rules between the respective items in the database on the basis of support and reliability. Here, the items are pairs including attributes and specific values of the attributes, and the association analysis is an analysis method for searching for association between all possible item sets in a given database. First of all, the support implies a ratio of a number of the process instances or executed activities which satisfy condition X and conclusion Y to a number of the whole process instances or executed activities.

S(X,Y)=P(X,Y)/number of whole process instances or executed activity instances

X: conditional

Y: consequent

P(X,Y): number of processes or executed activity instances including three items composed of a union of X and Y S(X,Y): support to the rule, 'if condition is X, conclusion is Y'

Such support can be recognized as statistical importance of the rule. Since support implies frequency of a frequently-generated pattern or rule, it should be increased so as to improve utility of the pattern or rule.

On the other hand, reliability implies a ratio of the process instances or executed activity instances which satisfy conclusion Y to the process instances or executed activity instances which satisfy condition X. Such reliability becomes an index for measuring accuracy of the rule 'if condition is X, conclusion is Y'. Accordingly, high reliability leads to accurate prediction.

C(X,Y)=P(X,Y)/P(X)

X: conditional

Y: consequent

P(X,Y): number of processes or executed activity instances including three items composed of a union of X and Y P(X): number of processes or executed activity instances including three items composed merely of X C(X,Y): reliability to the rule, 'if condition is X, conclusion is Y'

In conclusion, reliability of the rule shows how frequently the consequent can be applied to the conditional, and support shows how reliable the entire rule is.

On the other hand, all the variables which are analysis objects for analyzing association must be symbolic. Therefore, the digital variable needs to be converted into the symbolic variable by the discretization filter in the preprocessing process.

FIGS. 8A to 8D are views illustrating a process of the association analysis module.

Figure 8A:
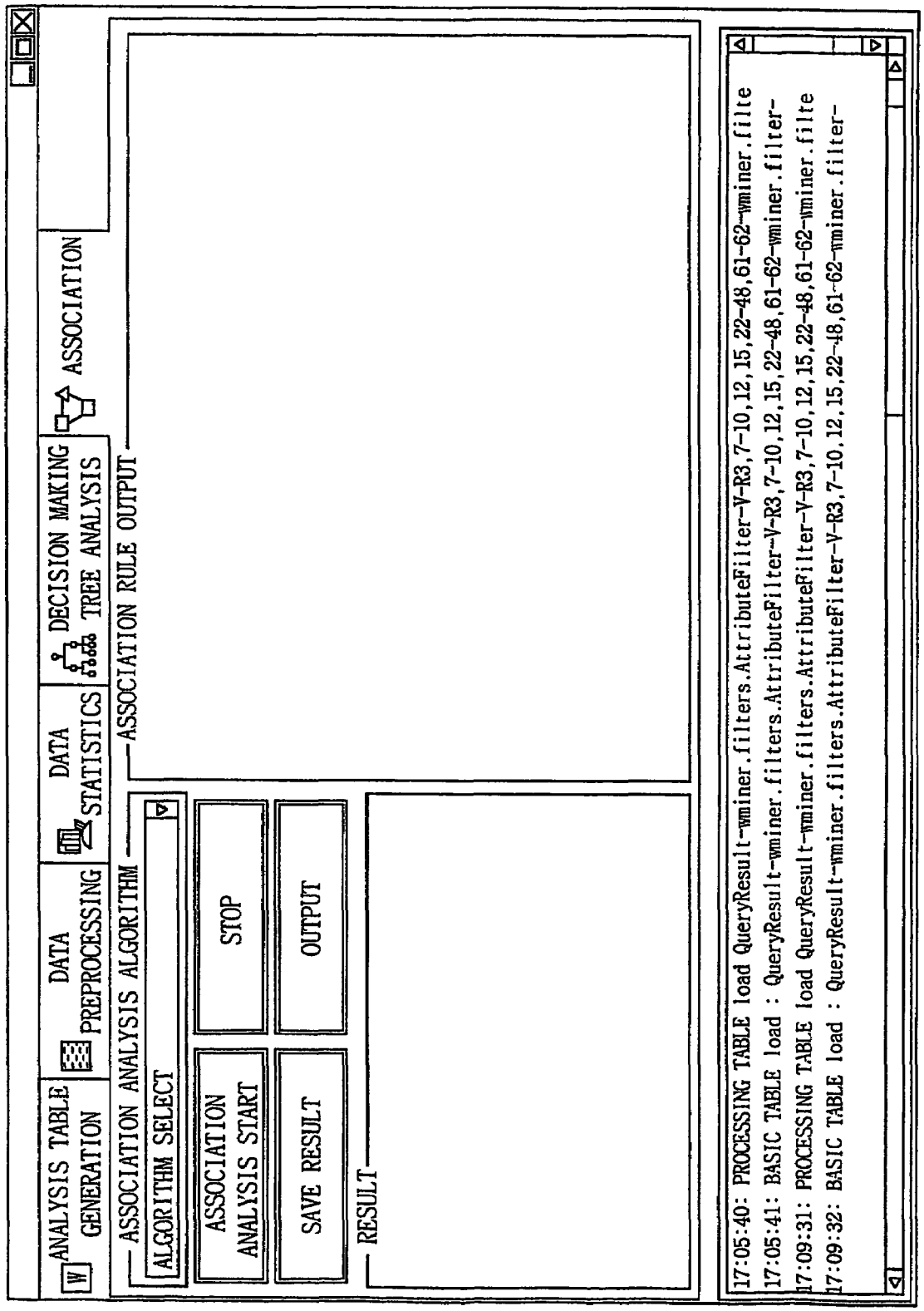
Figure 8B:
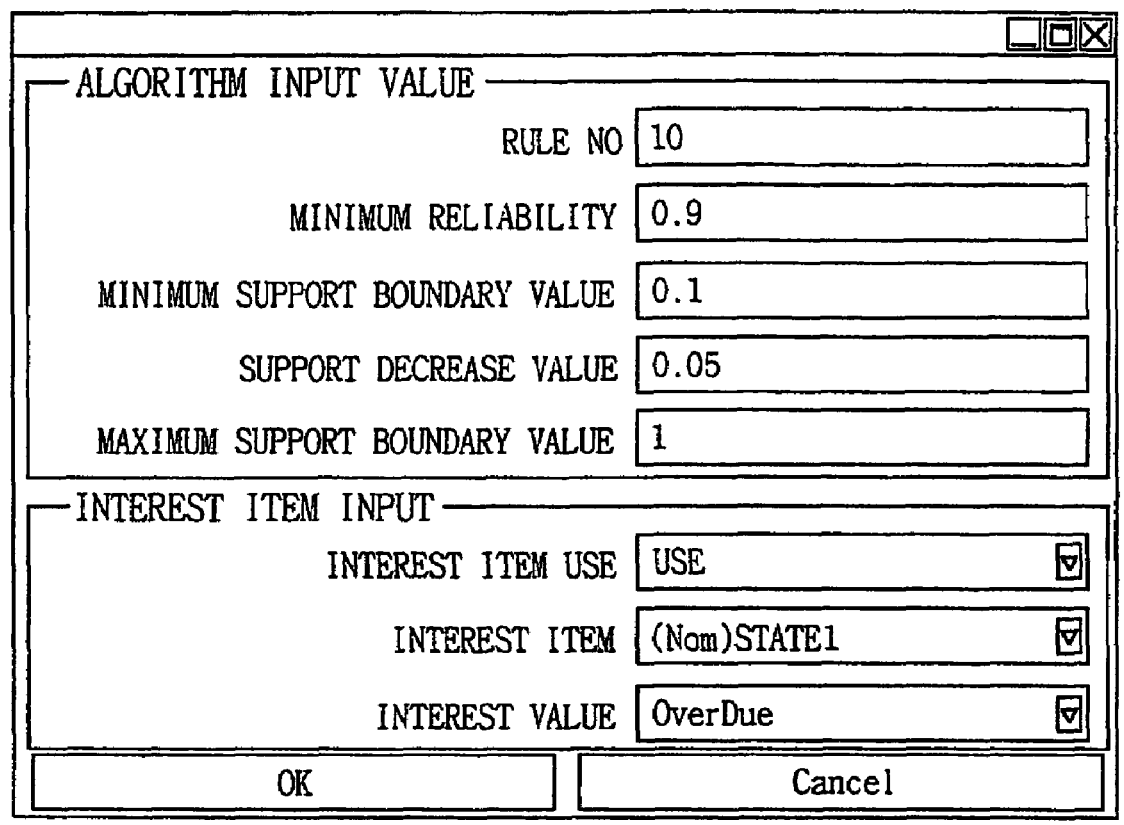

FIG. 8A shows an initial screen where the association analysis module is executed. The association analysis module is started by pressing an 'association' tap button at the top end of the screen of FIG. 8A. When the association analysis module is executed, the user selects an algorithm for the analysis. In accordance with the present invention, Apriori algorithm is used as the algorithm for analyzing association, which is not intended to be limiting. As shown in FIG. 8B, when the user selects the algorithm, the association analysis module provides an input window for setting up input variables for the analysis. The input variables include a number of wanted rules, minimum reliability, minimum support boundary value, support decrease value and maximum support boundary value. When the rule is produced, whether to use an interest item is decided and a variable for the interest item and an interest item value are designated in order to add the interest item to the consequent of the rule.

Figure 8C:
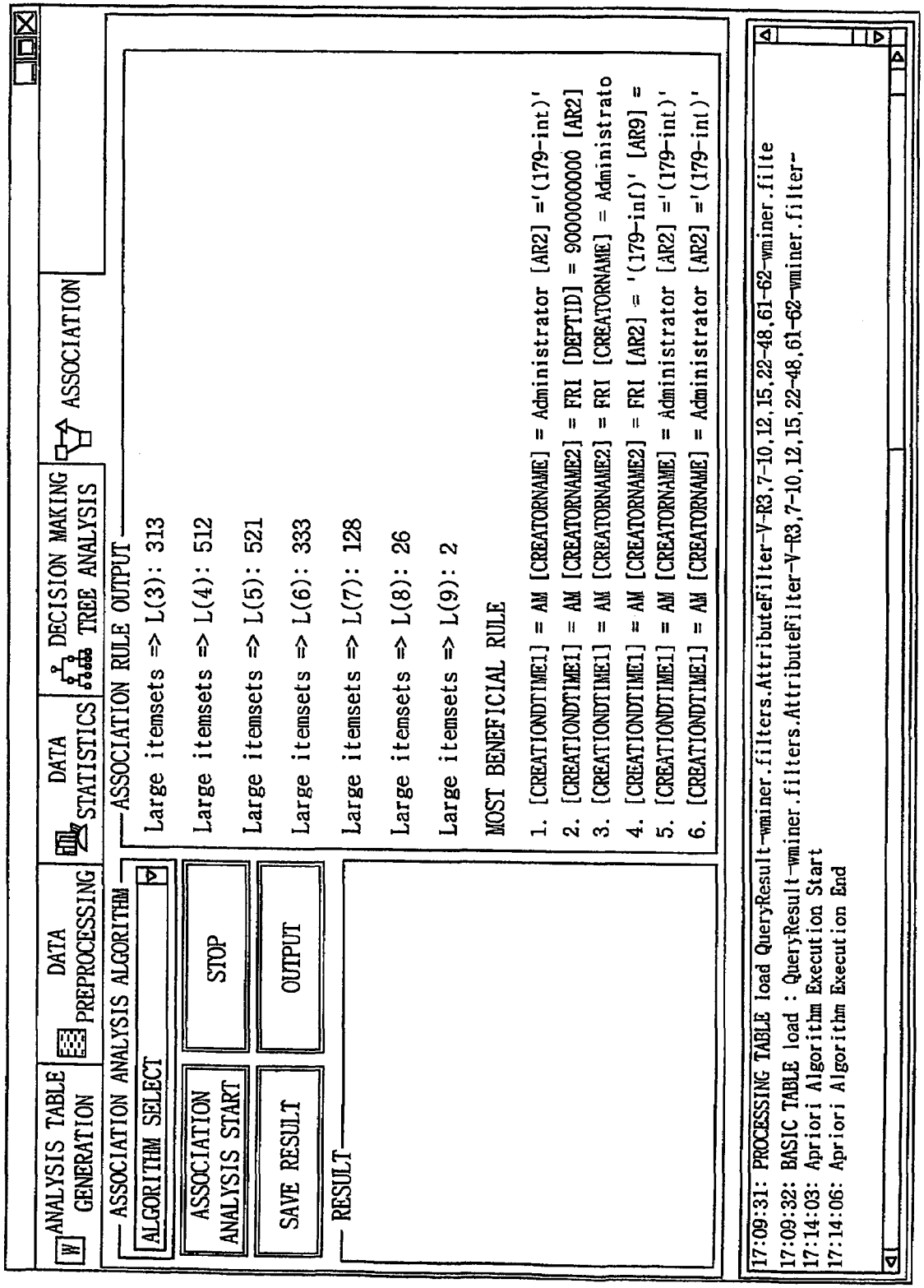

When setup of the input variables for executing the analysis module through Apriori algorithm is finished, the user clicks an 'association analysis start' button to execute Apriori algorithm. The association analysis module executes Apriori algorithm and produces an execution result as shown in FIG. 8C. Here, the association analysis result is displayed in form of text, but can be displayed in form of table as shown in FIG. 5D by clicking an 'output' button.

The analysis results of FIGS. 8C and 8D are rules generated on the basis of the input values inputted in FIG. 8B. Rule 10 of the analysis results of FIG. 8D has the following meanings:

Condition 1) the process is performed in the morning on Friday, (CREATIONDTIME1=AM, CREATIONDTIME2=FRI)

Condition 2) the execution time of the 2$^{nd}$ activity is over 179, (AR2='179-inf')

Condition 3) the execution time of the 9$^{th}$ activity is below 112, (AR9='-inf-112')

Condition 4) the execution time of the 10$^{th}$ activity is below 19, (AR10='-inf-19')

Conclusion) the process is overdue (STATE1=OverDue)

In addition, support and reliability for Rule 10 are 19% and 100% respectively. Accordingly, 19% of processes of the entire analysis object database can be explained under the above-mentioned rule, and reliability of the rule is 100%. That is, when the conditions are satisfied, the conclusion corresponding to the consequent always occurs.

The other rules can be interpreted in the same manner as Rule 10.

Figure 9:
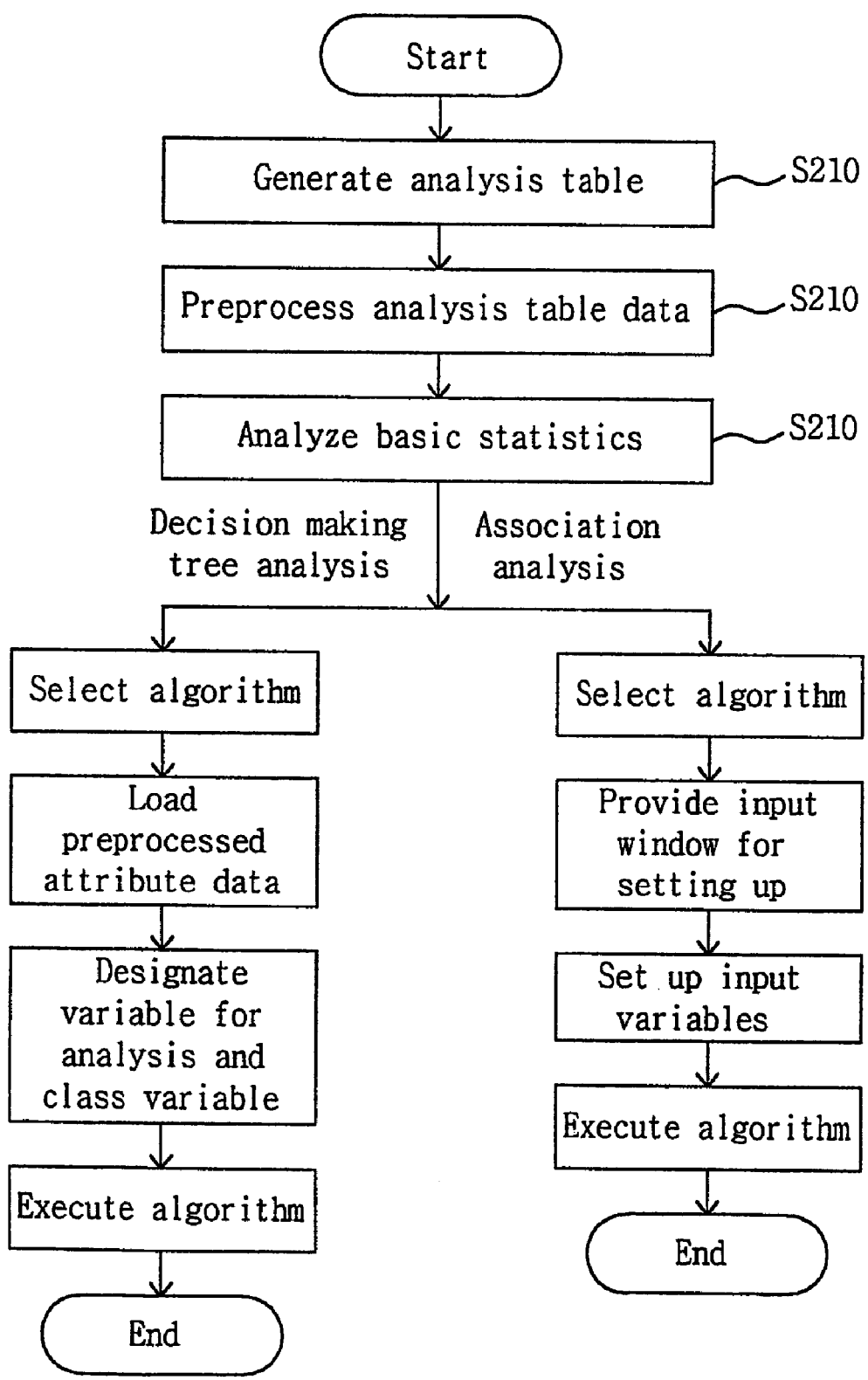
FIG. 9 is a flowchart showing a workflow mining method in accordance with the present invention.

FIG. 9 is a flowchart showing the workflow mining method in accordance with the present invention.

Firstly, when the workflow mining is intended to be performed on a specific process or activity, a corresponding process analysis table or activity analysis table is generated (S100).

When generation of the analysis table is finished, the preprocessing process is performed as an advance process for the decision making tree or association analysis (S110). In the preprocessing process, the data are loaded from the analysis table, attributes of specific data sets are removed, records of a specific section are removed, or the digital variable is converted into the symbolic variable by appropriately dividing sections. Especially to analyze association, the digital variable must be converted into the symbolic variable.

Thereafter, a process for confirming basic statistics for the selectively preprocessed data(S120). That is, the statistics show the maximum, minimum, average and standard deviation of the digital variable and the mode and frequency of the symbolic variable in regard to the preprocessed data. In addition, if necessary, the digital variables can be displayed in a histogram and the symbolic variables can be displayed in a pie chart.

When the preprocessing process is finished, the decision making tree analysis or association analysis can be made to analyze the data sets. In order to analyze the decision making tree, the algorithm for the decision making tree analysis is selected (S130), the preprocessed attribute data are loaded (S140), whether to use the data for the analysis is determined by variables and the class variable is designated (S150). Here, the class variable must be the symbolic variable. When the digital variable is designated as the class variable, the routine goes to the preprocessing process to perform the conversion. When selection of the variables is finished, the algorithm for the decision making tree analysis is executed to produce the result (S160).

On the other hand, when the association analysis is intended to be made after the preprocessing process, the algorithm for the association analysis is selected (S170). When selection of the algorithm is finished, the input window for setting up the input variables for analyzing association is provided (S180). When the number of the rules, minimum reliability, minimum support boundary value, support decrease value, maximum support boundary value, use of the interest item, interest item variable and interest item value are designated in the input window (S190), the algorithm for the association analysis is executed to produce the result (S200).

As the present invention may be embodied in several forms without departing from the spirit or essential characteristics thereof it should also be understood that the above-described embodiment is not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

As discussed earlier, in accordance with the present invention, the workflow mining system and the method therefor can evaluate, analyze and determine the previous execution results of the processes or activities by applying the special data mining technique to the workflow log data accumulated during the operation of the workflow and the data accumulated by the application system linked to the workflow system, thereby systematically reengineering general business processes.

What is claimed is:

1. A workflow mining system which is mounted on a workflow server having a workflow engine and a database for performing data mining on the basis of log data of the database, comprising:

a data extracting and processing means for extracting necessary data from the database and generating an analysis table;

a preprocessing means for removing unnecessary attributes on the basis of the extracted data, or converting a digital variable into a symbolic variable; and an analysis means for analyzing a decision making tree for deducing decision making tree type potential rules by using the preprocessed data, or analyzing association on the basis of support and reliability among the attributes.

2. The system according to claim 1, further comprising a data statistics module for providing statistical values for a data set in form of text or graph on the basis of the preprocessed data.

3. The system according to claim 1, wherein the analysis table comprises a process analysis table and an activity analysis table.

4. The system according to claim 1, wherein the preprocessing means comprises an analysis table data loading means for loading data of the analysis table.

5. The system according to claim 1, wherein an algorithm for analyzing the decision making tree is C4.5 algorithm.

6. The system according to claim 1, wherein an algorithm for analyzing association is Apriori algorithm.

7. A workflow mining method which performs data mining on the basis of log data of a database of a workflow server, comprising:

(a) a step for extracting necessary data from the database and generating an analysis table;

(b) a preprocessing step for removing unnecessary attributes on the basis of the extracted data, or converting a digital variable into a symbolic variable; and (c) an analysis step for analyzing a decision making tree for deducing decision making tree type potential rules by using the preprocessed data, or analyzing association on the basis of support and reliability among the attributes.

8. The method according to claim 7, further comprising a step for providing statistical values for a data set in form of text or graph on the basis of the preprocessed data between step (b) and step (c).

9. The method according to claim 7, wherein the analysis table comprises a process analysis table and an activity analysis table.

10. The method according to claim 7, wherein the preprocessing step comprises an analysis table data loading step for loading data of the analysis table.

11. The method according to claim 7, wherein an algorithm for analyzing the decision making tree is C4.5 algorithm.

12. The method according to claim 7, wherein an algorithm for analyzing association is Apriori algorithm.

13. The method according to claim 7, wherein, when the association analysis is made in step (c), the process for converting the digital variable into the symbolic variable is always performed in the step (b).

* * * * *